US012775612B2

(12) United States Patent
Ikeda et al.

(10) Patent No.: US 12,775,612 B2
(45) Date of Patent: Oct. 27, 2026

(54) INFORMATION PROCESSING SYSTEM AND METHOD

(71) Applicant: Kioxia Corporation, Tokyo (JP)

(72) Inventors: Taiga Ikeda, Kawasaki Kanagawa (JP); Daisuke Miyashita, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 19/075,862

(22) Filed: Mar. 11, 2025

(65) Prior Publication Data

US 2026/0079916 A1 Mar. 19, 2026

(30) Foreign Application Priority Data

Sep. 18, 2024 (JP) ................................ 2024-161101

(51) Int. Cl.
*G06F 16/24* (2019.01)
*G06F 16/242* (2019.01)
*G06F 16/245* (2019.01)

(52) U.S. Cl.
CPC .......... *G06F 16/242* (2019.01); *G06F 16/245* (2019.01)

(58) Field of Classification Search
CPC ............................ G06F 16/242; G06F 16/245
USPC ......................................................... 707/769
See application file for complete search history.

(56) References Cited

U.S. PATENT DOCUMENTS 10,452,978 B2 10/2019 Shazeer et al.
11,461,415 B2 * 10/2022 Lu ........................ G06F 40/284
12,313,727 B1 * 5/2025 Das ......................... G01S 7/417
12,354,340 B2 * 7/2025 Shlens ................... G06N 3/045
2021/0248450 A1 * 8/2021 Tay ........................ C12N 15/00
2021/0383191 A1 * 12/2021 Ainslie ................ G06N 3/0455
2023/0135109 A1 * 5/2023 Wu ..................... G06F 18/2163
706/12
2023/0154040 A1 * 5/2023 Guo ..................... G06N 3/0464
382/103

(Continued)

FOREIGN PATENT DOCUMENTS

JP 2024010798 A 1/2024
JP 2024093565 A 7/2024

OTHER PUBLICATIONS

Ying Sheng, et al., "FlexGen: High-Throughput Generative Inference of Large Language Models with a Single GPU", https://github.com/FMInference/FlexGen, Jun. 12, 2023, 23 pages.

*Primary Examiner* — Hanh B Thai
(74) *Attorney, Agent, or Firm* — Maier & Maier, PLLC

(57) ABSTRACT

According to one embodiment, a first key and a first value are stored in a memory device. Each time a self-attention input is input, a self-attention layer executes the following processing. The self-attention layer generates a query, a second key, and a second value based on the self-attention input. The self-attention layer stores the generated second key and second value into the memory device. The self-attention layer executes a first calculation to acquire an attention score by an inner product of the query and a key matrix including the first key and the second key stored in the memory device. The self-attention layer executes a second calculation to calculate an inner product of the attention score and a value matrix including the first value and the second value stored in the memory device. The self-attention layer outputs a result of the second calculation.

18 Claims, 7 Drawing Sheets

(56) References Cited

U.S. PATENT DOCUMENTS

| | | | | |
|---|---|---|---|---|
| 2024/0153130 | A1* | 5/2024 | Son | G06T 7/73 |
| 2024/0211447 | A1 | 6/2024 | Tatsuno | |
| 2024/0403636 | A1* | 12/2024 | Likhosherstov | G06N 3/045 |
| 2024/0412054 | A1* | 12/2024 | Szegedy | G06N 3/084 |
| 2025/0139432 | A1* | 5/2025 | Renggli | G06N 3/096 |
| 2025/0200274 | A1* | 6/2025 | Jaiswal | G06N 3/09 |
| 2025/0231974 | A1* | 7/2025 | Qiu | G06F 16/3347 |
| 2025/0371333 | A1* | 12/2025 | Kriman | G06N 3/08 |

* cited by examiner

INFORMATION PROCESSING SYSTEM AND METHOD

CROSS-REFERENCE TO RELATED APPLICATIONS

This application is based upon and claims the benefit of priority from Japanese Patent Application No. 2024-161101, filed on Sep. 18, 2024, the entire contents of which are incorporated herein by reference.

FIELD

Embodiments described herein relate generally to an information processing system and a method.

BACKGROUND

A transformer neural network has been widely known as one of machine learning models. The transformer neural network includes an attention layer. Based on a relationship between elements included in an input sequence, the attention layer strengthens information to be observed and weakens information not to be observed.

DETAILED DESCRIPTION

According to the present embodiment, an information processing system includes one or more computers and one or more memory devices. The one or more computers are configured to execute processing of a transformer neural network by executing a command. The one or more memory devices are configured to store a first set of a first key and a first value. The transformer neural network includes a self-attention layer. The transformer neural network is configured to perform processing. The processing includes inputting a self-attention input to the self-attention layer in response to input to the transformer neural network of a first input sequence. The first input sequence includes respective network inputs at input positions in input order. The self-attention input is input for each of the input positions. The processing to be performed by the transformer neural network includes outputting an output sequence corresponding to the first input sequence based on an output from the self-attention layer corresponding to the self-attention input. The self-attention layer is configured to perform processing each time the self-attention input is input. The processing to be performed by the self-attention layer includes generating a query based on the self-attention input and a first input position being one of the input positions. The first position corresponds to the self-attention input. The processing to be performed by the self-attention layer includes generating a key based on the self-attention input and the first input position and storing a second key being the generated key into the one or more memory devices, and generating a value based on the self-attention input and storing a second value being the generated value into the one or more memory devices. The processing to be performed by the self-attention layer includes acquiring the first key and the first value from the one or more memory devices. The processing to be performed by the self-attention layer includes executing a first calculation to acquire an attention score by an inner product of the query and a key matrix. The key matrix includes the first key and the second key each having been stored in the one or more memory devices. The processing to be performed by the self-attention layer includes executing a second calculation to calculate an inner product of the attention score and a value matrix. The value matrix includes the first value and the second value each having been stored in the one or more memory devices. The processing to be performed by the self-attention layer includes outputting a result of the second calculation.

Hereinafter, an information processing system and a method according to embodiments will be described in detail with reference to the accompanying drawings. The present invention is not limited by these embodiments.

First Embodiment

Figure 1:
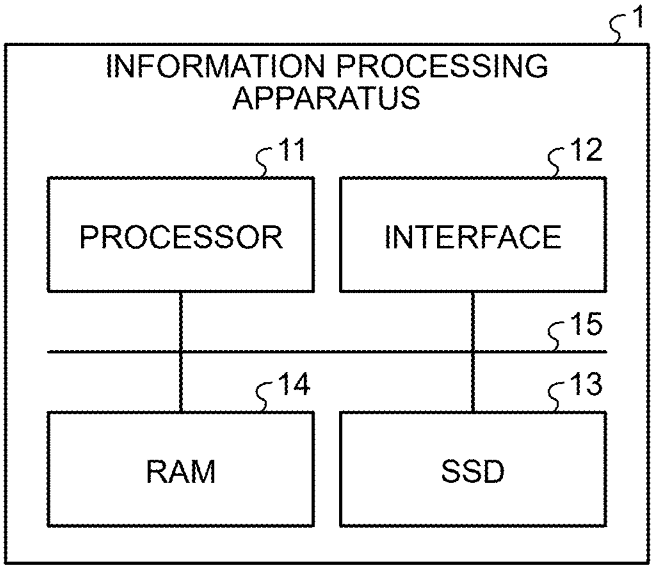
FIG. 1 is a diagram illustrating an example of a configuration of an information processing system according to a first embodiment.

FIG. 1 is a diagram illustrating an example of a configuration of an information processing system according to a first embodiment.

An information processing apparatus 1 is an information processing system according to the first embodiment. In the example illustrated in FIG. 1, the information processing apparatus 1 includes a processor 11, an interface 12, a solid state drive (SSD) 13, a random access memory (RAM) 14, and a bus 15. The processor 11, the interface 12, the SSD 13, and the RAM 14 are electrically connected to the bus 15.

The interface 12 is a device for inputting and outputting information to and from the information processing apparatus 1. The interface 12 includes an interface for communication via a network, an interface to which a memory device can be connected, an interface to which an input device such as a keyboard can be connected, etc.

The SSD 13 is a large-capacity nonvolatile memory functioning as a storage device in the information processing apparatus 1. The storage device applicable to the information processing apparatus 1 is not limited to an SSD. The information processing apparatus 1 may include a magnetic disk device (hard disk drive (HDD) as an example) as a storage device.

The RAM 14 is a memory to which an access operation is performed at a higher speed than a storage device. The RAM 14 functions as a cache region, a buffer region, work region, or the like. As the RAM 14, a dynamic random access memory (DRAM), a static random access memory (SRAM), or a combination of these is applicable. A memory applicable as the RAM 14 is not limited to these. The RAM 14 may be whichever of a volatile memory and a nonvolatile memory.

The processor 11 is an arithmetic device that can execute a computer program, and implements a function defined by the computer program. In one example, the processor 11 is a central processing unit (CPU). In the information processing apparatus 1, the processor 11 executes processing of the transformer neural network in accordance with an information processing program (an information processing program PRG to be described later).

The processor 11 serves an example of a computer. The SSD 13 and the RAM 14 serve as an example of one or more memory devices.

In the example illustrated in FIG. 1, the information processing system according to an embodiment includes one information processing apparatus 1. The information processing system according to an embodiment may include two or more information processing apparatuses. Further, the information processing apparatus 1 may include two or more processors each having a configuration equivalent to the processor 11.

Figure 2:
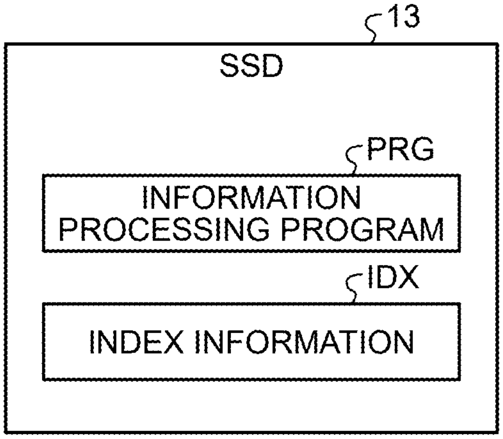
FIG. 2 is a diagram illustrating an example of information stored in a solid state drive (SSD) according to the first embodiment.

FIG. 2 is a diagram illustrating an example of information stored in the SSD 13 according to the first embodiment. In the example illustrated in this diagram, an information processing program PRG and index information IDX are stored in the SSD 13.

As described above, the processor 11 executes the processing of the transformer neural network by executing the information processing program PRG. The transformer neural network to be implemented by the processor 11 in accordance with the information processing program PRG will be referred to as a transformer 100.

The information processing program PRG is an example of a command.

Prior to the description of the index information IDX, the transformer 100 will briefly be described.

The transformer 100 converts an input sequence SQ into an output sequence corresponding to the input sequence SQ. The input sequence SQ is an array in which multiple elements (hereinafter, will be referred to as tokens) are arranged in input order. Each of the elements (i.e., token) is an example of a network input. Thus, the input sequence SQ has respective network inputs at input positions in input order.

In one example, text data can be input as the input sequence SQ to the transformer 100. In a case where the input sequence SQ is data of a text, each word included in the text is a token. The input sequence SQ that can be input to the transformer 100 is not limited to such text data. Image data, voice data, or video data may be input as the input sequence SQ to the transformer 100.

The transformer 100 generates the output sequence by sequentially executing processing on each token. In this specification, a token that is being processed by the transformer 100 will also be referred as a token.

The transformer 100 includes an attention layer. Based on a relationship between tokens included in the input sequence SQ, the attention layer strengthens information to be observed and weakens information not to be observed. In order to consider the relationship between tokens included in the input sequence SQ, the attention layer generates, as intermediate data, a pair of a key vector and a value vector for each token input to the attention layer.

More specifically, each time a token is newly input, the attention layer generates a query vector, a key vector, and a value vector from the newly-input token. The attention layer accumulates a pair of the generated key vector and the value vector into a particular memory space. The memory space is included in the one or more memory devices. The pair of the key vector and the value vector will be referred to as a key value pair. From among key vectors included in a group of the accumulated key value pairs, the attention layer identifies a key vector with the closest distance to the query vector. Then, the attention layer regards a value vector that becomes paired with the identified key vector, among the group of the accumulated value vectors, as the information to be observed, and strengthens the value vector, regards other value vectors as the information not to be observed, and weakens the other value vectors, calculates a sum of the group of the accumulated value vectors, and outputs the sum.

Hereinafter, a value vector that becomes paired with a key vector will be referred to as a value vector corresponding to a key vector.

A technique to be compared with the embodiment will be described. A technique to be compared with the embodiment will be referred as a comparative example. According to the comparative example, if the generation or output of an output sequence corresponding to an input sequence is completed, the transformer neural network discards a group of key value pairs generated by processing of the attention layer on the input sequence and accumulated in a particular memory space. In other words, based only on a group of key value pairs generated from one input sequence, processing of the attention layer is performed on the one input sequence.

Thus, according to the comparative example, as the length of the input sequence gets longer, an amount of key value pairs generated as intermediate data and accumulated becomes larger, and a time required to obtain an output corresponding to the input sequence gets longer.

In contrast, according to the first embodiment, before a certain input sequence SQ (will be referred to as a first input sequence SQ) is input, processing of the transformer neural network is executed on a second input sequence SQ. A group of key value pairs obtained by processing of the transformer neural network on the second input sequence SQ is stored into the SSD 13. When an output sequence corresponding to the first input sequence SQ is generated, the attention layer executes processing of the attention layer using a group of key value pairs including a key value pair generated for each token included in the first input sequence SQ, and a key value pair preliminarily generated based on the second input sequence SQ. In other words, by preliminarily ending processing of the transformer neural network on a partial input sequence SQ (second input sequence SQ) of all the input sequences SQ, a time required for processing of the transformer neural network on the input sequence SQ (the first input sequence SQ) to be input later is suppressed.

Moreover, in the first embodiment, a group of preliminarily-generated key value pairs stored in the SSD 13 (i.e., a group of key value pairs generated based on the second input sequence SQ) is graphed in such a manner that search can be performed by a method of approximate nearest neighbor search (ANN).

As described above, in the attention layer, value vectors corresponding to key vectors other than the key vector with the closest distance to the query vector is weakened. Thus, if value vectors corresponding to key vectors with distances not close to the query vector are ignored, among value vectors included in the group of key value pairs generated based on the second input sequence SQ, there is no influence or almost no influence on the result on the processing of the transformer neural network.

Considering the above, in the first embodiment, only a certain number of key value pairs including one of a certain number of key vectors each having the closest distance to the query vector, among the group of key value pairs generated based on the second input sequence SQ are read out from the SSD 13, and used for the processing of the attention layer. In order to identify the certain number of key value pairs including one of the certain number of key vectors each having the closest distance to the query vector, the attention layer performs search by the method of ANN. The certain number is a small number. More specifically, the certain number is one or more than one. Hereinafter, for ease of explanation, the description will be given on the assumption that the certain number is one.

The index information IDX is information obtained by graphing the group of key value pairs generated based on the second input sequence SQ. Thus, the index information IDX includes information defining a graph structure, in addition to information regarding the group of key value pairs generated based on the second input sequence SQ. In accordance with the graph structure defined by the index information IDX, the attention layer searches for a key value pair including a key vector with the closest distance to the query vector, among the group of key value pairs generated based on the second input sequence SQ. A detailed data structure of the index information IDX will be described later.

In this specification, a distance is a measure indicating a similarity degree between pieces of data. In the attention layer, a distance between a query vector and a key vector is acquired by a calculation of an inner product of the query vector and the key vector. In the ANN, a distance may be acquired by the calculation of the inner product or by a calculation different from the calculation of the inner product. A calculated value obtained by the inner product takes a larger value as a distance between the query vector and the key vector is closer.

Figure 3:
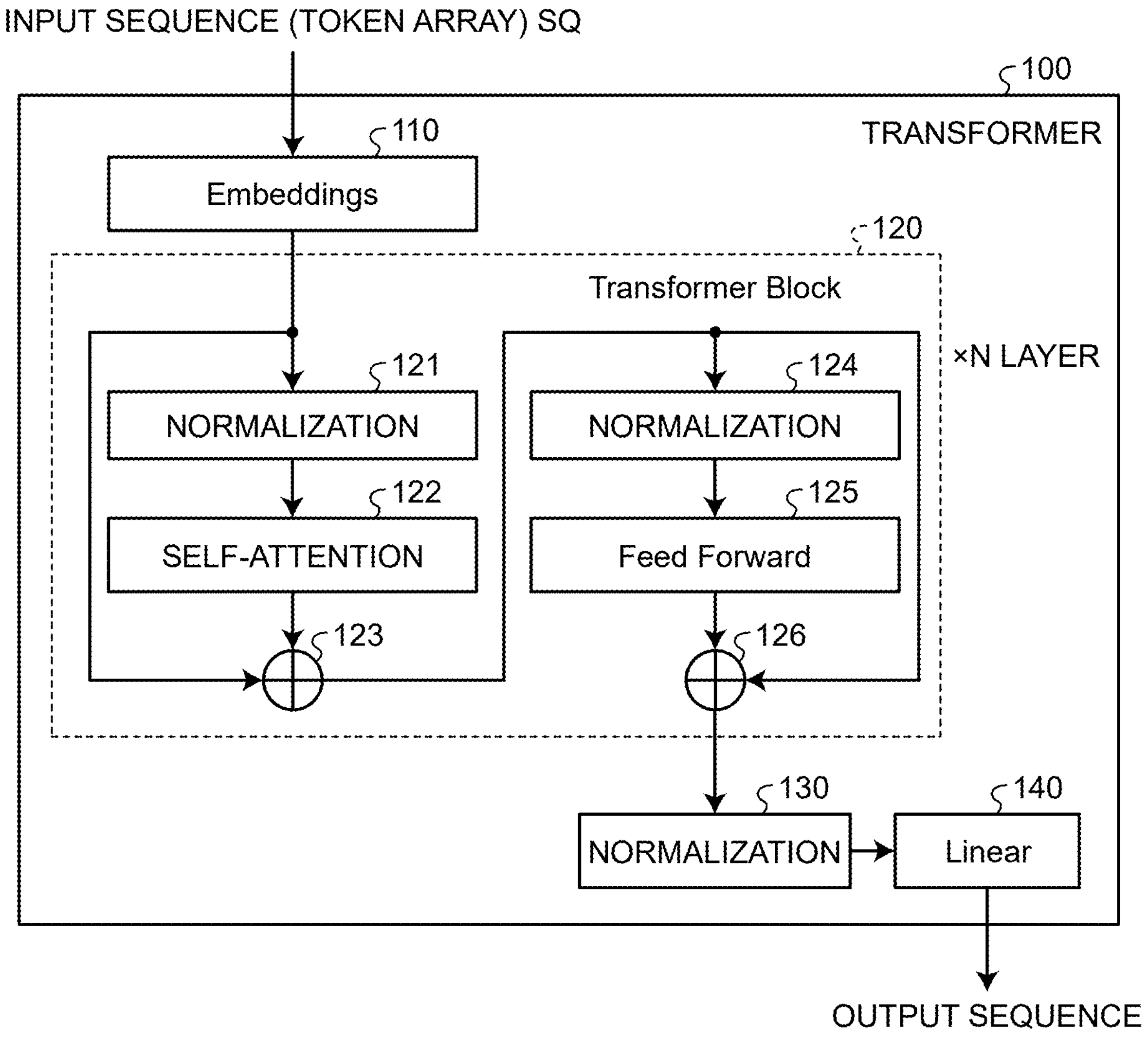
FIG. 3 is a diagram illustrating an example of a configuration of a transformer according to the first embodiment.

FIG. 3 is a diagram illustrating an example of a configuration of the transformer 100 according to the first embodiment.

The transformer 100 includes an embedding layer 110, N-layered transformer blocks 120, a layer normalization 130, and a linear layer 140. N is a natural number equal to or larger than 1.

The input sequence SQ is input to the transformer 100. The input sequence SQ is an array including a plurality of tokens. The tokens are input to the transformer 100 in input order. Hereinafter, the input order refers to an input order in the input sequence SQ.

The embedding layer 110 vectorizes a token, and maps the vectorized token in a fixed-length embedding vector by linear transformation. In other words, the embedding layer 110 converts a token into an embedding representation. Tokens are input to the embedding layer 110 in input order. Then, the embedding layer 110 converts each of the tokens into an embedding representation in input order.

The tokens converted by the embedding layer 110 into embedding representations are input to the N-layered transformer blocks 120 in input order.

In a case where N is 1, the transformer blocks 120 perform, for each token, processing on tokens sequentially input from the embedding layer 110, and inputs the processed tokens to the layer normalization 130 in input order.

In a case where N is 2 or more, the N-layered transformer blocks 120 are connected in serial. A beginning (head) transformer block 120 of the N-layered transformer blocks 120 performs, for each token, processing on tokens sequentially input from the embedding layer 110, and outputs the processed tokens to a posterior transformer block 120 in input order. The transformer blocks 120 connected posteriorly to the beginning transformer block 120 among the N-layered transformer blocks 120 perform, for each token, processing on tokens sequentially input from anterior transformer blocks 120, and output the processed tokens to posterior transformer blocks 120 or the layer normalization 130 in input order.

The layer normalization 130 performs normalization on the sequentially-input tokens for each token. The tokens normalized by the layer normalization 130 are input to the linear layer 140 in input order.

The linear layer 140 performs linear transformation on the sequentially-input tokens for each token. The linear layer 140 can include a learnable parameter. The tokens linearly-converted by the linear layer 140 are output from the transformer 100 as an output sequence.

Each of the transformer blocks 120 includes a layer normalization 121, a self-attention layer 122, a coupling unit 123, a layer normalization 124, a feed forward layer 125, and a coupling unit 126. The self-attention layer 122 is one type of attention layers.

Tokens in input order are sequentially input from the embedding layer 110 or an anterior transformer block 120 to the layer normalization 121 and the coupling unit 123.

The layer normalization 121 performs normalization on the sequentially-input tokens for each token. The tokens normalized by the layer normalization 121 are input to the self-attention layer 122 in input order.

The self-attention layer 122 performs processing on the sequentially-input tokens for each token. The details of the processing in the self-attention layer 122 will be described later. The tokens processed by the self-attention layer 122 are input to the coupling unit 123 in input order.

Hereinafter, each token that is input to the self-attention layer 122 will be sometimes referred to as a self-attention input. Each token output from the self-attention layer 122 will be sometimes referred to as a self-attention output.

The coupling unit 123 couples tokens at the same input positions from among tokens sequentially input from the embedding layer 110 or the anterior transformer block 120, and tokens sequentially input from the self-attention layer 122. The tokens coupled by the coupling unit 123 are input to the layer normalization 124 and the coupling unit 126 in input order.

The layer normalization 124 performs normalization on the sequentially-input tokens for each token. The tokens normalized by the layer normalization 124 are input to the feed forward layer 125 in input order.

The feed forward layer 125 is constituted by a neural network. The feed forward layer 125 executes processing of the neural network on the sequentially-input tokens for each token.

The coupling unit 126 couples tokens at the same input positions from among tokens sequentially input from the coupling unit 123, and tokens sequentially input from the feed forward layer 125. The tokens coupled by the coupling unit 126 are input to a posterior transformer block 120 or the layer normalization 130 in input order.

The configuration of the transformer 100 illustrated in FIG. 3 is mere one example. Components included in the transformer 100 and connection between the components can be changed in various ways. For example, the ordering between the layer normalization 124 and the feed forward layer 125 may be reverse to a connection relationship illustrated in FIG. 3.

In the first embodiment, the transformer 100 is assumed to process the first input sequence SQ and the second input sequence SQ. A transformer 100 that processes the first input sequence SQ, and a transformer 100 that processes the second input sequence SQ may be different in configuration. The processing of the attention layer in such a case can be referred to as cross-attention instead of self-attention.

Figure 4:
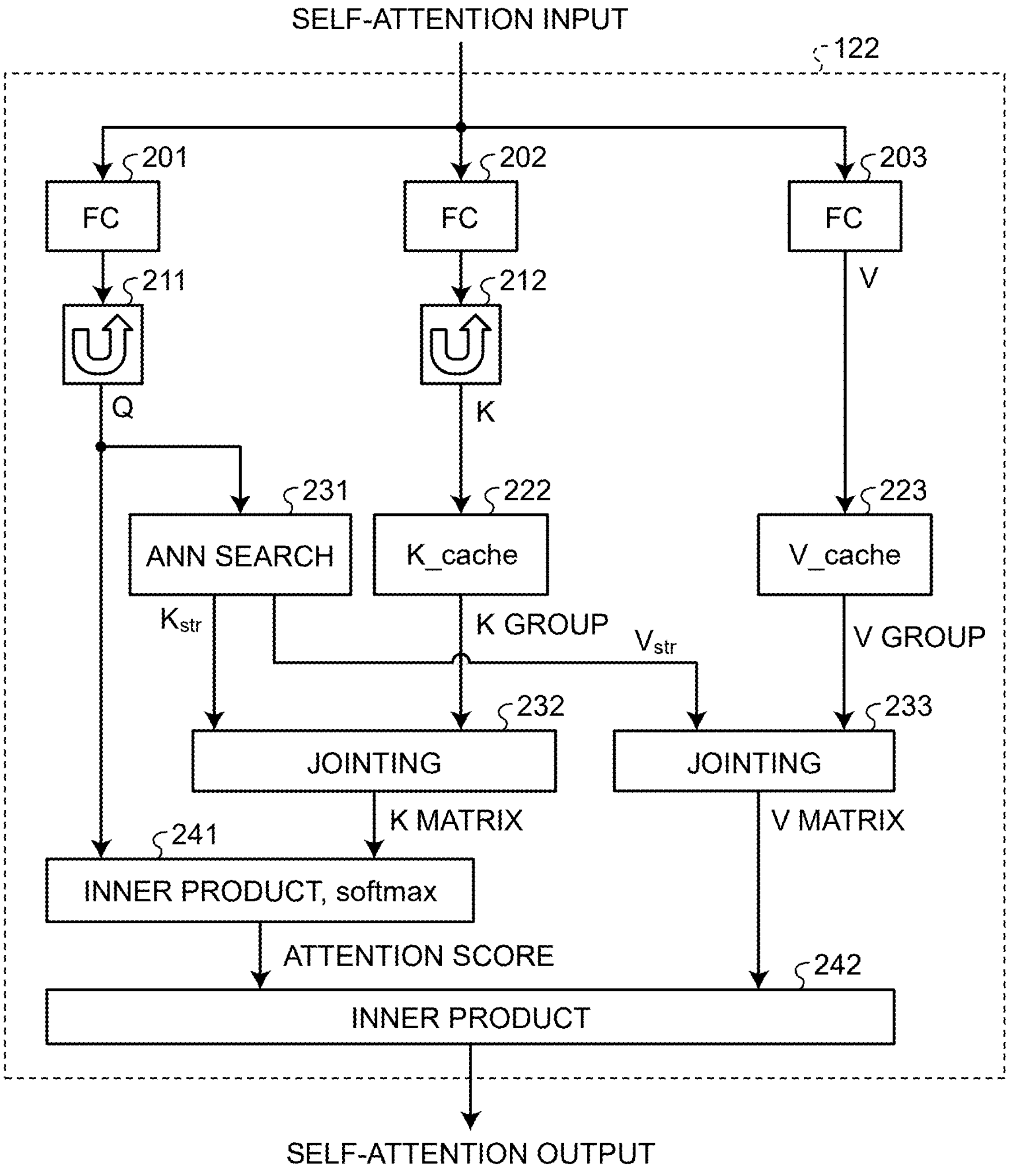
FIG. 4 is a diagram illustrating an example of a configuration of a self-attention layer according to the first embodiment.

FIG. 4 is a diagram illustrating an example of a configuration of the self-attention layer 122 according to the first embodiment.

Tokens having been subjected to processing anterior to the self-attention layer 122 are input to the self-attention layer 122 in input order. Thus, a token is input to the self-attention layer 122 for each of input positions. The self-attention layer 122 sequentially performs processing on the input tokens for each token, and outputs the processed tokens as attention outputs.

As configurations for the purpose, the self-attention layer 122 includes fully-connected neural networks 201, 202, and 203, positional encoding layers 211 and 212, a K_cache storage unit 222, a V_cache storage unit 223, an ANN search unit 231, jointing units 232 and 233, a first calculation unit 241, and a second calculation unit 242.

Writing/reading of vector is frequently performed with respect to the K_cache storage unit 222 and the V_cache storage unit 223. Thus, the K_cache storage unit 222 and the V_cache storage unit 223 can be allocated to the RAM 14. One or both of the K_cache storage unit 222 and the V_cache storage unit 223 may be allocated to the SSD 13.

A token input to the self-attention layer 122 as a self-attention input is input in common to the fully-connected neural networks 201, 202, and 203.

A token processed by the fully-connected neural network 201 is input to the positional encoding layer 211. The positional encoding layer 211 embeds an input position of an input token into the input token. The token into which the input position is embedded by the positional encoding layer 211 is input to the ANN search unit 231 and the first calculation unit 241 as a query vector Q.

Note that the above-described input position of the token is an example of a first input position.

A token processed by the fully-connected neural network 202 is input to the positional encoding layer 212. The positional encoding layer 212 embeds an input position of an input token into the input token. The token into which the input position is embedded by the positional encoding layer 212 is stored into the K_cache storage unit 222 as a key vector K. Thus, key vectors K of all the tokens processed by the self-attention layer 122 after the input of the input sequence SQ is started are accumulated in the K_cache storage unit 222.

A token processed by the fully-connected neural network 203 is stored into the V_cache storage unit 223 as a value vector V. Thus, value vectors V of all the tokens processed by the self-attention layer 122 after the input of the input sequence SQ is started are accumulated in the V_cache storage unit 223.

By performing search by the method of ANN in accordance with the graph structure defined by the index information IDX, the ANN search unit 231 searches for a key value pair including a key vector K with the closest distance to the query vector Q, from among a group of preliminarily-generated key value pairs. Out of a key vector K (will be referred to as key vector $K_{str}$) and a value vector V (will be referred to as value vector $V_{str}$) included in a key value pair obtained by the search, the key vector $K_{str}$ is input to the jointing unit 232 and the value vector $V_{str}$ is input to the jointing unit 233.

A group of all the key vectors K accumulated in the K_cache storage unit 222 is input to the jointing unit 232. By jointing the key vector $K_{str}$ and the group of key vectors K input from the K_cache storage unit 222, the jointing unit 232 generates a matrix (will be referred to as a K matrix) including the key vector $K_{str}$ and all the key vectors K accumulated in the K_cache storage unit 222. The generated K matrix is input to the first calculation unit 241.

A group of all the value vectors V accumulated in the V_cache storage unit 223 is input to the jointing unit 233. By jointing the value vector $V_{str}$ and the group of value vectors V input from the V_cache storage unit 223, the jointing unit 233 generates a matrix (will be referred to as a V matrix) including the value vector $V_{str}$ and all the value vectors V accumulated in the V_cache storage unit 223. The generated V matrix is input to the second calculation unit 242.

The first calculation unit 241 executes a first calculation including a calculation of an inner product of a query vector Q and a K matrix. By the calculation of the inner product of the query vector Q and the K matrix, a distance to the query vector Q is obtained for each key vector K included in the K matrix.

In the first calculation, the first calculation unit 241 further causes a softmax function to act on a calculation result of the inner product. A distance of each key vector K included in the K matrix is thereby converted into a calculated value having a property described below.

In a case where a distance to the query vector Q is the closest, the calculated value is close to 1, and in a case where the distance to the query vector Q is not closest, the calculated value becomes almost 0. Calculated values of all the key vectors K fall within a range of 0 or more and 1 or less, and a sum of the calculated values of all these key vectors K is 1.

A value vector V corresponding to a key vector K with a calculated value obtained by the first calculation that is closer to 1 is regarded as information to be observed, and a value vector V corresponding to a key vector K with a calculated value obtained by the first calculation that is closer to 0 is regarded as information not to be observed. Thus, a vector obtained by collecting calculated values obtained for each key vector K included in the K matrix will be referred to as an attention score, meaning that it indicates an attention degree of each value vector V included in the V matrix.

The attention score generated by the first calculation unit 241 is input to the second calculation unit 242. The second calculation unit 242 executes a second calculation including a calculation of an inner product of the attention score and the V matrix. By the second calculation, a sum of all the value vectors V included in the V matrix that uses the attention score as a weight is calculated. In other words, while a value vector V to be observed being strengthened, and a value vector V not to be observed being weakened, the sum of all the value vectors V included in the V matrix is calculated. A vector obtained by the second calculation is output as a self-attention output.

Figure 5:
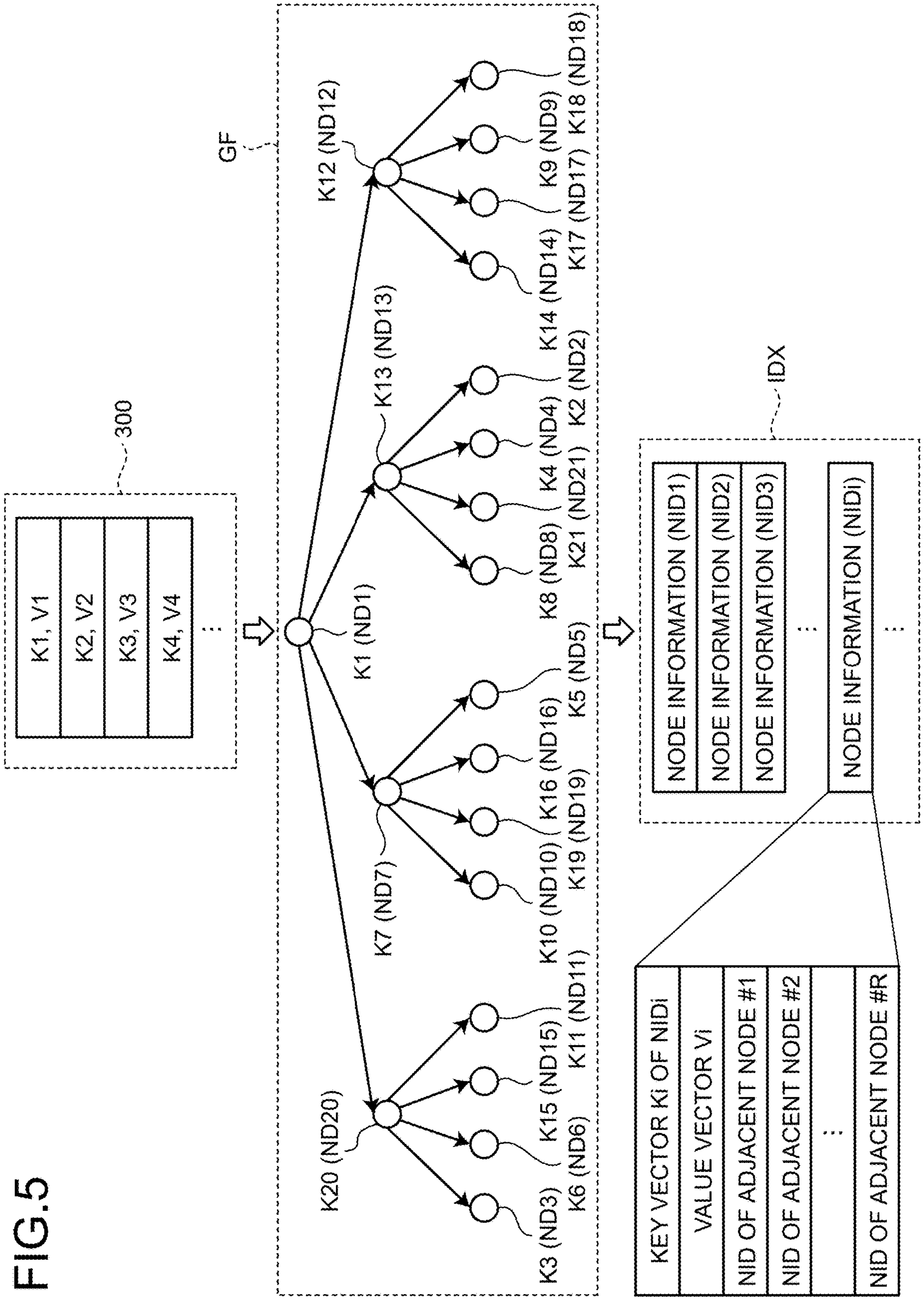
FIG. 5 is a diagram for explaining a data structure of index information according to the first embodiment.

FIG. 5 is a diagram for explaining a data structure of the index information IDX according to the first embodiment.

A pair set 300 is a group of key value pairs generated by the self-attention layer 122 based on the second input sequence SQ. Each key vector K included in the pair set 300 is regarded as a node, and assigned a node ID. Then, a directed graph GF in which nodes are connected at an edge is generated.

In the example illustrated in FIG. 5, the pair set 300 including a pair of a key vector K1 and a value vector V1, a pair of a key vector K2 and a value vector V2, a pair of a key vector K3 and a value vector V3, and the like is preliminarily generated. A unique numerical value "i" is given to a key vector Ki as a node ID. In FIG. 5, a node whose node ID is "i" is referred to as a node NDi. A node ID of the node NDi is referred to as NIDi.

In the example of the directed graph GF illustrated in FIG. 5, an edge having a node ND20 as a head, an edge having a node ND7 as a head, an edge having a node ND13 as a head, and an edge having a node ND12 as a head are connected to a node ND1. An edge having a node ND3 as a head, an edge having a node ND6 as a head, an edge having a node ND15 as a head, and an edge having a node ND11 as a head are connected to the node ND20. An edge having a node ND10 as a head, an edge having a node ND19 as a head, an edge having a node ND16 as a head, and an edge having a node ND5 as a head are connected to the node ND7. An edge having a node ND8 as a head, an edge having a node ND21 as a head, an edge having a node ND4 as a head, and an edge having a node ND2 as a head are connected to the node ND13. An edge having a node ND14 as a head, an edge having a node ND17 as a head, an edge having a node ND9 as a head, and an edge having a node ND18 as a head are connected to the node ND12.

The above-described structure of the directed graph GF is mere one example. A method of generating the directed graph GF from the pair set 300 may be an optional method as long as the search of the generated directed graph GF can be performed by the method of ANN.

In this specification, in a case where a node NDa and a node NDb are connected at an edge having the node NDb as a head, the node NDb will be referred to as an adjacent node of the node NDa.

Based on the pair set 300 and the structure of the directed graph GF, the index information IDX is generated. In the example illustrated in FIG. 5, the index information IDX has a data structure in which pieces of node information are arrayed in the order of node IDs. Each piece of node information includes a key vector K of one node (will be referred to as a target node), a value vector V corresponding to the key vector K of the target node, and a list of node IDs of adjacent nodes of the target node. In other words, each piece of node information includes a key value pair and information regarding adjacent nodes that serves as information defining the structure of the directed graph GF.

The ANN search unit 231 identifies a key value pair including a key vector with a closest distance to the query vector Q, in accordance with the directed graph GF defined by the index information IDX. As an arithmetic algorithm for search by the ANN search unit 231, an optional algorithm including Greedy search, Beam search, and the like can be employed. In one example, the ANN search unit 231 sequentially switches a search target node between nodes in accordance with the graph GF. Each time the search target node is switched, the ANN search unit 231 calculates a distance between each adjacent node of the search target node and the query vector Q. Then, the ANN search unit 231 sets, as a next new search target node, a node closest to the query vector Q among one or more adjacent nodes of one or more search target nodes close to the query vector Q at the present moment. The ANN search unit 231 sequentially performs the switching of the search target node in accordance with the directed graph GF until the search target node reaches a node estimated to be closest to the query vector Q. The processing of switching the search target node in accordance with the graph GF will also be referred to as a "hop operation".

Sequentially, an operation of the information processing apparatus 1 according to the first embodiment will be described.

Figure 6:
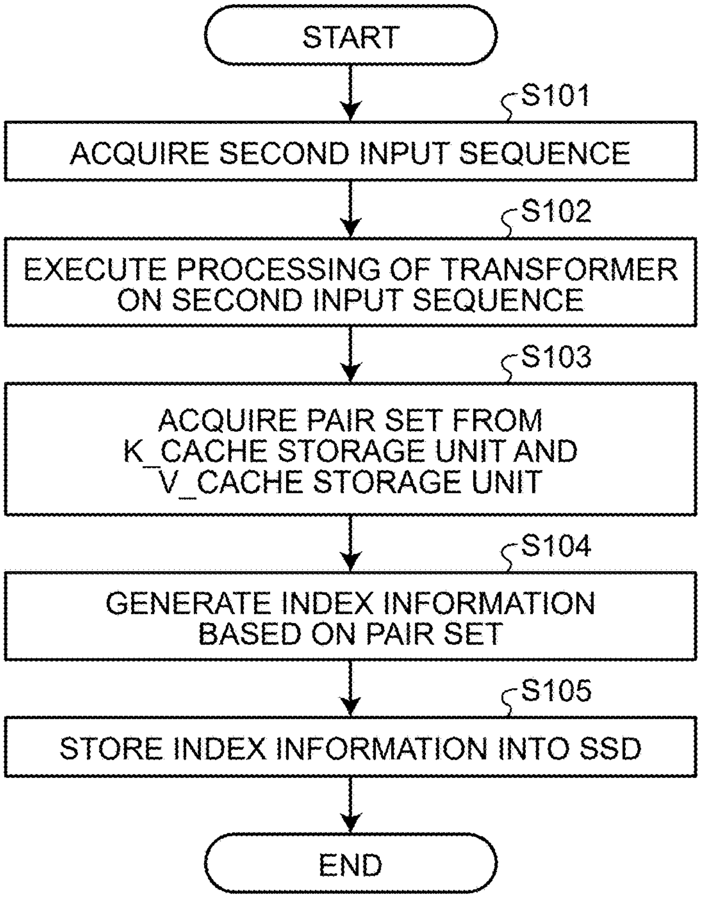
FIG. 6 is a flowchart illustrating an example of an operation corresponding to a second input sequence of the information processing system according to the first embodiment.

FIG. 6 is a flowchart illustrating an example of an operation in response to the second input sequence SQ of the information processing apparatus 1 according to the first embodiment.

First of all, the processor 11 acquires the second input sequence SQ (S101). An acquisition method of the second input sequence SQ is not limited to a specific method.

For example, the second input sequence SQ may be input to the information processing apparatus 1 by an operator of the information processing apparatus 1. Alternatively, the processor 11 may acquire content of some sort as the second input sequence SQ via a network such as Internet™, in accordance with the information processing program PRG or another program.

Sequentially, the processor 11 executes processing of the transformer 100 on the second input sequence SQ in accordance with the information processing program PRG (S102). The processor 11 outputs the acquired second input sequence SQ to the transformer 100, and executes processing of the transformer 100 on the second input sequence SQ.

At a time point of S102, the index information IDX has not been generated yet. Thus, in the self-attention layer 122, search by the ANN search unit 231 is not performed. In other words, a K matrix is constructed based only on key vectors K accumulated in the K_cache storage unit 222, and a V matrix is constructed based only on value vectors V accumulated in the V_cache storage unit 223.

In a case where another input sequence SQ (will be referred to as an input sequence SQ') is input to the transformer 100 prior to the second input sequence SQ before S102, the above-described configuration is not applicable. For example, in the transformer 100 to which the input sequence SQ' has been input, another pair set (will be referred to as a pair set 300') is generated by processing executed by the self-attention layer 122, and index information (will be referred to as index information IDX') is acquired based on the pair set 300'. Then, in S102, the ANN search unit 231 may perform a search that uses the index information IDX'.

When the processing of the transformer 100 on the second input sequence SQ is completed, accumulation of key vectors K into the K_cache storage unit 222 is completed, and accumulation of value vectors V into the V_cache storage unit 223 is completed. The processor 11 acquires the pair set 300 from the K_cache storage unit 222 and the V_cache storage unit 223 in accordance with the information processing program PRG or another program (S103).

The processor 11 generates the index information IDX in accordance with the information processing program PRG or another program (S104), and stores the generated index information IDX into the SSD 13 (S105). Then, an operation in response to the second input sequence SQ ends.

In the example illustrated in FIG. 6, the information processing apparatus 1 executes the processing in S101-S105. Part of or all the processing in S101-S105 may be executed by another information processing apparatus different from the information processing apparatus 1. In one example, the processing in S101-S105 may be executed by a certain information processing apparatus and the generated the index information IDX may be transferred from the certain information processing apparatus to the SSD 13 included in the information processing apparatus 1.

Figure 7:
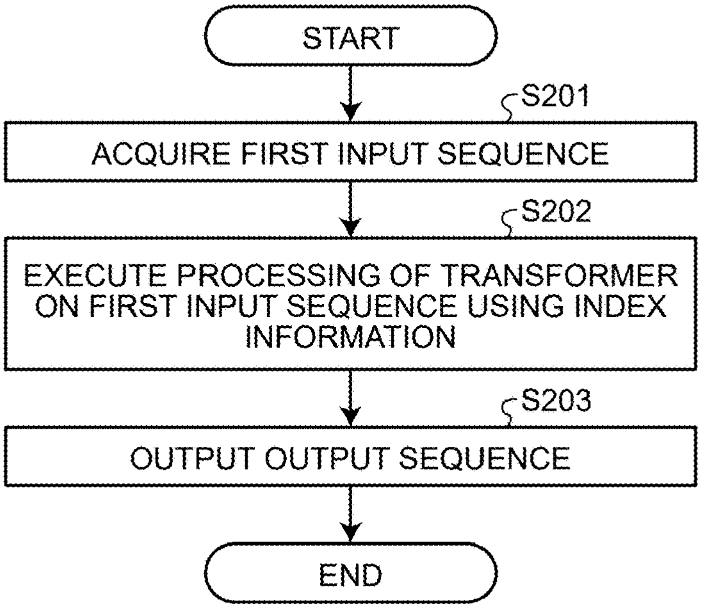
FIG. 7 is a flowchart illustrating an example of an operation corresponding to a first input sequence of the information processing system according to the first embodiment.

FIG. 7 is a flowchart illustrating an example of an operation in response to the first input sequence SQ of the information processing apparatus 1 according to the first embodiment.

The processor 11 acquires the first input sequence SQ (S201). The processor 11 executes the processing of the transformer 100 on the first input sequence SQ in accordance with the information processing program PRG (S202). In S202, the index information IDX generated by a series of operations illustrated in FIG. 6 is used.

The processor 11 outputs an output sequence generated by the processing of the transformer 100 on the first input sequence SQ (S203), and an operation in response to the first input sequence SQ ends.

As described above, according to the first embodiment, the index information IDX defining the graph structure of the directed graph GF in which each of key vectors K is regarded as a node is stored in the SSD 13. Value vectors V are respectively correlated with the key vectors K included in the index information IDX. The self-attention layer 122 executes a next operation each time a token is input as a self-attention input. The self-attention layer 122 generates a query vector Q based on an input token (will be referred to as a target token) and an input position of the target token, generates a key vector K based on the target token and the input position of the target token, and generates a value vector V based on the target token. The self-attention layer 122 stores the generated key vector K into the K_cache storage unit 222, and stores the generated value vector V into the V_cache storage unit 223. The self-attention layer 122 acquires the key vector $K_{str}$ and the value vector $V_{str}$ by performing a search by the method of ANN using the index information IDX and the query vector Q. The self-attention layer 122 acquires an attention score by the first calculation including the calculation of an inner product of the query vector Q and a K matrix including the key vector $K_{str}$ and all the key vectors K stored in the K_cache storage unit 222. The self-attention layer 122 executes the second calculation to calculate an inner product of the attention score and a V matrix including the value vector $V_{str}$ and all the value vectors V stored in the V_cache storage unit 223. The self-attention layer 122 outputs a result of the second calculation.

Since processing of the transformer 100 is executed by using a preliminarily-generated key value pair, a time required for the processing of the transformer 100 is suppressed. In other words, high-speed processing of the transformer neural network is implemented.

According to the first embodiment, the index information IDX is stored in the SSD 13. Then, the self-attention layer 122 acquires the key vector $K_{str}$ and the value vector $V_{str}$ from the SSD 13 by search.

A nonvolatile storage device like the SSD 13 generally has larger capacity and is less expensive as compared with a memory like the RAM 14 that can perform a high-speed operation. Thus, it is possible to inexpensively implement processing of the transformer 100 that uses large-scale index information IDX.

According to the first embodiment, prior to the first input sequence SQ, the information processing apparatus 1 inputs another input sequence SQ (i.e., the second input sequence SQ) to the transformer 100. The key vector $K_{str}$ is a key vector K generated by the self-attention layer 122 in accordance with the input of the second input sequence SQ to the transformer 100. The value vector $V_{str}$ is a value vector V generated by the self-attention layer 122 in accordance with the input of the second input sequence SQ to the transformer 100.

The information processing apparatus 1 acquires the pair set 300 from key vectors K generated by the self-attention layer 122 in accordance with the input of the second input sequence SQ to the transformer 100, and value vectors V generated by the self-attention layer 122 in accordance with the input of the second input sequence SQ to the transformer 100. Then, the information processing apparatus 1 generates the index information IDX based on the pair set 300.

Part of or all the operation of acquiring the pair set 300 based on the second input sequence SQ and the operation of generating the index information IDX based on the pair set 300 may be executed by an apparatus different from the information processing apparatus 1.

Second Embodiment

In the first embodiment, a certain number (one as an example) of key value pairs of the pair set 300 is acquired by the search by the method of ANN, and the acquired certain number of key value pairs are used for the processing of the self-attention layer 122. All the key value pairs included in the pair set 300 may be used for the processing of the self-attention layer 122. In a second embodiment, a configuration in which all the key value pairs included in a pair set 300 is used for the processing of a self-attention layer 122 will be described. In the second embodiment, the description of the same items as those in the first embodiment will be omitted or the same items will be schematically described.

Figure 8:
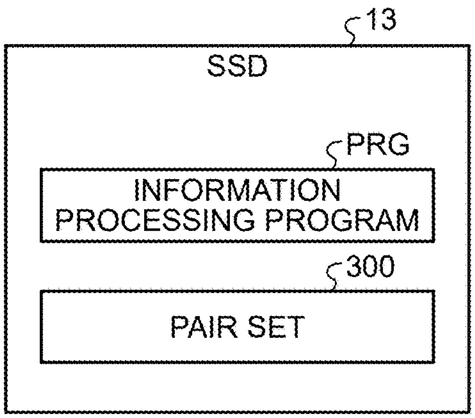
FIG. 8 is a diagram illustrating an example of information stored in an SSD according to a second embodiment.

FIG. 8 is a diagram illustrating an example of information stored in an SSD 13 according to the second embodiment.

In place of the index information IDX, a pair set 300 generated based on a second input sequence SQ is stored in the SSD 13.

Figure 9:
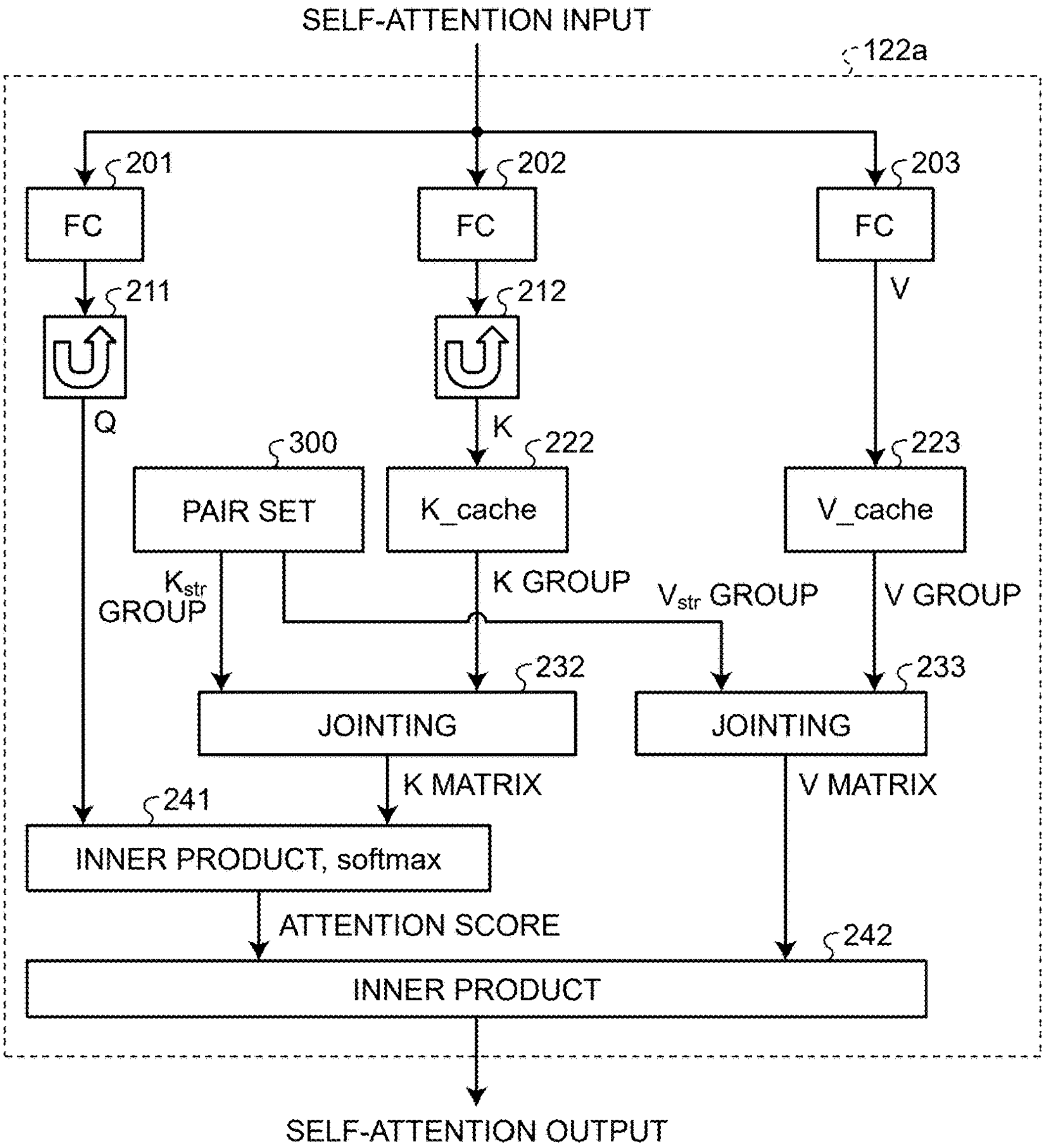
FIG. 9 is a diagram illustrating an example of a configuration of a self-attention layer according to the second embodiment.

FIG. 9 is a diagram illustrating an example of a configuration of a self-attention layer 122*a* according to the second embodiment.

The self-attention layer 122*a* differs from the self-attention layer 122 in that the ANN search unit 231 is not included.

The self-attention layer 122*a* reads, from the SSD 13, all the key vectors K (will be referred to as a key vector $K_{str}$ group) included in the pair set 300, and all the value vectors V (will be referred to as a value vector $V_{str}$ group) included in the pair set 300. The self-attention layer 122*a* inputs the key vector $K_{str}$ group to a jointing unit 232. The self-attention layer 122*a* inputs the value vector $V_{str}$ group to a jointing unit 233.

By jointing the key vector $K_{str}$ group and a group of key vectors K input from a K_cache storage unit 222, the jointing unit 232 generates a K matrix including the key vector $K_{str}$ group and all the key vectors K accumulated in the K_cache storage unit 222. The generated K matrix is input to a first calculation unit 241.

By jointing the value vector $V_{str}$ group and a group of value vectors V input from a V_cache storage unit 223, the jointing unit 233 generates a V matrix including the value vector $V_{str}$ group and all the value vectors V accumulated in the V_cache storage unit 223. The generated V matrix is input to a second calculation unit 242.

In this manner, the pair set 300 generated based on the second input sequence SQ is stored into the SSD 13, and the self-attention layer 122*a* may be configured to use all the key value sets included in the pair set 300, for the processing of the attention layer.

Third Embodiment

In a third embodiment, a processor 11 is configured to be able to select index information IDX to be used in a self-attention layer 122, from among pieces of index information IDX. In the third embodiment, the description of the same items as those in the first embodiment will be omitted or the same items will be schematically described.

Figure 10:
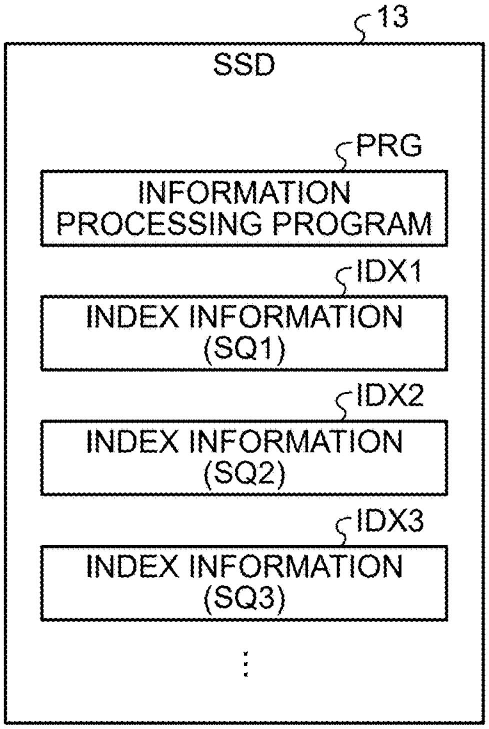
FIG. 10 is a diagram illustrating an example of information stored in an SSD according to a third embodiment.

FIG. 10 is a diagram illustrating an example of information stored in an SSD 13 according to the third embodiment.

In place of the index information IDX, pieces of index information IDX respectively generated based on different second input sequences SQ are stored in the SSD 13.

In the example illustrated in FIG. 10, index information IDX1, index information IDX2, and index information IDX3, and the like are stored. The index information IDX1 is index information obtained by graphing a pair set generated based on a second input sequence SQ1. The index information IDX2 is index information obtained by graphing a pair set generated based on a second input sequence SQ2 different from the second input sequence SQ1. The index information IDX3 is index information obtained by graphing a pair set generated based on a second input sequence SQ3 different from the second input sequence SQ1 and the second input sequence SQ2.

Figure 11:
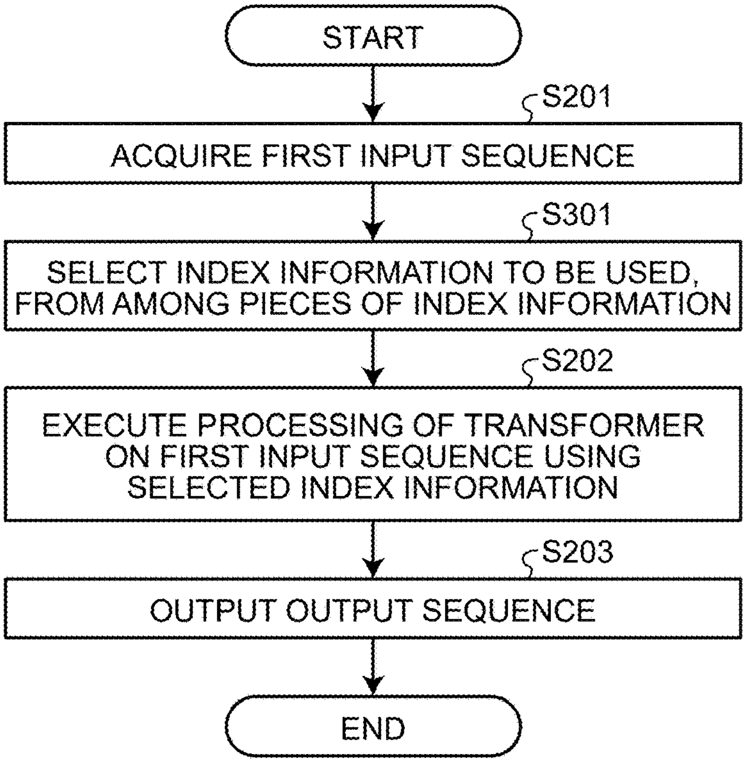
FIG. 11 is a flowchart illustrating an example of an operation corresponding to a first input sequence of an information processing system according to the third embodiment.

FIG. 11 is a flowchart illustrating an example of an operation in response to a first input sequence SQ of an information processing apparatus 1 according to the third embodiment.

First of all, the processor 11 acquires the first input sequence SQ (S201). Accordingly, the processor 11 selects the index information IDX to be used, from among pieces of index information IDX stored in the SSD 13, in accordance with an information processing program PRG or another program (S301).

In one example, the processor 11 selects index information IDX generated based on the second input sequence SQ most similar to the first input sequence SQ from among the pieces of index information IDX.

A selection method of the index information IDX is not limited to the above-described one. For example, meta-information such as a summary is correlated with the pieces of index information IDX. The processor 11 may be configured to select the index information IDX based on a comparison between the first input sequence SQ and meta-information correlated with each piece of index information IDX.

Alternatively, the processor 11 may be configured to select the index information IDX based on optional information, in addition to the first input sequence SQ or in place of the first input sequence SQ.

Moreover, the number of pieces of index information IDX selected in S301 is not limited to one.

The processing in S301 is an example of selection processing.

After S301, the processor 11 executes processing of the transformer 100 on the first input sequence SQ in accordance with the information processing program PRG (S202). In S202, the index information IDX selected by the processing in S301 is used.

The processor 11 outputs an output sequence generated by the processing of the transformer 100 on the first input sequence SQ (S203), and an operation corresponding to the first input sequence SQ ends.

The technique of the third embodiment can be used together with the technique of the second embodiment. Thus, the description given in the third embodiment can be implemented even in a case where the index information IDX is replaced with the pair set 300.

As described above, according to the first embodiment, the second embodiment, and the third embodiment, at least a pair of the key vector $K_{str}$ and the value vector $V_{str}$ is stored in the SSD 13. The self-attention layer 122 executes a next operation each time a token is input as a self-attention input. The self-attention layer 122 generates a query vector Q based on an input token (will be referred to as a target token) and an input position of the target token, generates a key vector K based on the target token and the input position of the target token, and generates a value vector V based on the target token. The self-attention layer 122 stores the generated key vector K into the K_cache storage unit 222, and stores the generated value vector V into the V_cache storage unit 223. The self-attention layer 122 acquires an attention score by a first calculation including a calculation of an inner product of the query vector Q and a K matrix including the key vector $K_{str}$ and all the key vectors K stored in the K_cache storage unit 222. The self-attention layer 122 executes a second calculation including a calculation of an inner product of the attention score and a V matrix including the value vector $V_{str}$ and all the value vectors V stored in the V_cache storage unit 223. The self-attention layer 122 outputs a result of the second calculation.

Therefore, high-speed processing of the transformer neural network is implemented.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:

one or more computers configured to execute processing of a transformer neural network by executing a command; and one or more memory devices configured to store a first set of a first key and a first value, wherein the transformer neural network includes a self-attention layer, the transformer neural network is configured to input a self-attention input to the self-attention layer in response to first input to the transformer neural network; and output a first output corresponding to the first input based on an output from the self-attention layer corresponding to the self-attention input;

the self-attention layer is configured to
generate a query based on the self-attention input and first input position corresponding to the self-attention input,
generate a key based on the self-attention input and the first input position and store a second key being the generated key into the one or more memory devices,
generate a value based on the self-attention input and store a second value being the generated value into the one or more memory devices,
acquire the first key and the first value from the one or more memory devices,
execute a first calculation to acquire an attention score by an inner product of the query and a key matrix, the key matrix including the first key and the second key each having been stored in the one or more memory devices,
execute a second calculation to calculate an inner product of the attention score and a value matrix, the value matrix including the first value and the second value each having been stored in the one or more memory devices, and
output a result of the second calculation,
the one or more memory devices store index information defining a graph structure of a directed graph in which fourth keys are each defined as a node and are each correlated with a corresponding one of fourth values,
the self-attention layer is configured to execute search by a method of approximate nearest neighbor (ANN) search using the index information and the query,
the first key is one of the fourth keys obtained by the search, and
the first value is one of the fourth values corresponding to the first key.

2. The information processing system according to claim 1, wherein
the one or more memory devices include a nonvolatile storage device, and
the first key and the first value are stored in the nonvolatile storage device.

3. The information processing system according to claim 2, wherein the nonvolatile storage device include a solid state drive (SSD) or a magnetic disk device.

4. The information processing system according to claim 1, wherein a second input sequence is input to the transformer neural network before the first input is input,
the fourth keys are keys generated by the self-attention layer in processing of the transformer neural network on the second input sequence, and
the fourth values respectively correlated with the fourth keys are values generated by the self-attention layer in the processing of the transformer neural network on the second input sequence.

5. The information processing system according to claim 1, wherein
a second input sequence is input to the transformer neural network before the first input is input,
the first key is a key generated by the self-attention layer in processing of the transformer neural network on the second input sequence, and
the first value is a value generated by the self-attention layer in the processing of the transformer neural network on the second input sequence.

6. The information processing system according to claim 5, wherein the nonvolatile storage device include a solid state drive (SSD) or a magnetic disk device.

7. The information processing system according to claim 1, wherein
the first set includes second sets each including a third key and a third value,
the one or more computers are configured to execute selection processing in executing of the command,
the selection processing is processing of selecting at least one of the second sets, and
the self-attention layer is configured to
execute the first calculation by using a third key included in the at least one of the second sets selected by the selection processing, and
execute the second calculation by using a third value included in the at least one of the second sets selected by the selection processing.

8. The information processing system according to claim 7, wherein the one or more memory devices include a solid state drive (SSD) or a magnetic disk device.

9. The information processing system according to claim 1, wherein the one or more memory devices include a solid state drive (SSD) or a magnetic disk device.

10. A method implemented by an information processing system including one or more computers, the one or more computers configured to execute processing of a transformer neural network, the transformer neural network including a self-attention layer, the method comprising:
inputting a first input to the transformer neural network;
inputting a self-attention input to the self-attention layer response to the inputting of the first input;
generating a query based on the self-attention input and a first input position, the first position corresponding to the self-attention input,
generating a key based on the self-attention input and the first input position and storing a second key being the generated key into one or more memory spaces,
generating a value based on the self-attention input and storing a second value being the generated value into the one or more memory spaces,
acquiring a first key and a first value from the one or more memory spaces in which a first set of the first key and the first value is stored,
executing a first calculation to acquire an attention score by an inner product of the query and a key matrix, the key matrix including the first key and the second key each having been stored in the one or more memory spaces,
executing a second calculation to calculate an inner product of the attention score and a value matrix, the value matrix including the first value and a second value each having been stored in the one or more memory spaces, and
outputting a result of the second calculation; and
outputting, from the transformer neural network, a first output corresponding to the first input based on an output from the self-attention layer;
the one or more memory device stores index information defining a graph structure of a directed graph in which fourth keys are each defined as a node, wherein
the fourth keys are each correlated with a corresponding one of fourth values,
the self-attention layer is configured to execute search by a method of approximate nearest neighbor (ANN) search using the index information and the query,
the first key is one of the fourth keys obtained by the search, and
the first value is one of the fourth values corresponding to the first key.

11. The method according to claim 10, wherein the one or more memory spaces are included in a nonvolatile storage device, and the first key and the first value are stored in the nonvolatile storage device.

12. The method according to claim 11, wherein the nonvolatile storage device includes a solid state drive (SSD) or a magnetic disk device.

13. The method according to claim 10, further comprising inputting a second input sequence to the transformer neural network before the first input is input to the transformer neural network, wherein the fourth keys are keys generated by the self-attention layer in processing of the transformer neural network on the second input sequence, and the fourth values respectively correlated with the fourth keys are values generated by the self-attention layer in the processing of the transformer neural network on the second input sequence.

14. The method according to claim 10, further comprising inputting a second input sequence to the transformer neural network before the first input is input to the transformer neural network, wherein the first key is a key generated by the self-attention layer in processing of the transformer neural network on the second input sequence, and the first value is a value generated by the self-attention layer in the processing of the transformer neural network on the second input sequence.

15. The method according to claim 14, wherein the nonvolatile storage spaces are included in a solid state drive (SSD) or a magnetic disk device.

16. The method according to claim 10, wherein the first set includes second sets each including a third key and a third value, the method further comprises executing selection processing, the selection processing being processing of selecting at least one of the second sets, and the self-attention layer is configured to execute the first calculation by using a third key included in the at least one of the second sets selected by the selection processing, and execute the second calculation by using a third value included in the at least one of the second sets selected by the selection processing.

17. The method according to claim 16, wherein the one or more memory spaces are included in a solid state drive (SSD) or a magnetic disk device.

18. The method according to claim 10, wherein the one or more memory spaces are included in a solid state drive (SSD) or a magnetic disk device.

* * * * *